United States Patent [19]
Hirayama

[11] Patent Number: 5,715,430
[45] Date of Patent: Feb. 3, 1998

[54] MULTIPROCESSOR COMPUTER SYSTEM AND A METHOD FOR MEMORY ALLOCATION TO OPTIMIZE CACHE COHERENCY WITHIN THE SYSTEM

[75] Inventor: Hideaki Hirayama, Kanagawa-ken, Japan

[73] Assignee: Kabushiki Kaisha Toshiba, Kawasaki, Japan

[21] Appl. No.: 768,590

[22] Filed: Dec. 18, 1996

Related U.S. Application Data

[63] Continuation of Ser. No. 427,821, Apr. 26, 1995, abandoned.

[30] Foreign Application Priority Data

Apr. 26, 1994 [JP] Japan ................. 6-088445

[51] Int. Cl.$^6$ ............... G06F 12/00; G06F 13/00
[52] U.S. Cl. ............... 395/468; 364/DIG. 1; 364/243.4; 364/243.41; 364/231.8; 395/445; 395/411; 395/497.02
[58] Field of Search ............... 364/DIG. 1, DIG. 2, 364/243.41, 243.45, 243.4, 231.8; 395/411, 445, 474, 468, 497.02

[56] References Cited

U.S. PATENT DOCUMENTS

| | | | |
|---|---|---|---|
| 5,019,965 | 5/1991 | Webb, Jr. et al. | 395/550 |
| 5,095,424 | 3/1992 | Woffiden et al. | 395/450 |
| 5,113,514 | 5/1992 | Albonesi et al. | 395/471 |
| 5,130,922 | 7/1992 | Liu | 395/200 |
| 5,170,477 | 12/1992 | Potter et al. | 395/411 |
| 5,222,225 | 6/1993 | Groves | 395/842 |
| 5,313,609 | 5/1994 | Baylor et al. | 395/448 |
| 5,317,720 | 5/1994 | Stamm et al. | 395/470 |
| 5,335,332 | 8/1994 | Chirstopher, Jr. et al. | 395/400 |
| 5,369,753 | 11/1994 | Tipley | 395/449 |
| 5,404,489 | 4/1995 | Woods et al. | 395/479 |
| 5,434,993 | 7/1995 | Liencres et al. | 395/460 |
| 5,511,226 | 4/1996 | Zilka | 395/823 |

Primary Examiner—Tod R. Swann
Assistant Examiner—Tuan V. Thai
Attorney, Agent, or Firm—Cushman, Darby & Cushman IP Group of Pillsbury Madison & Sutro LLP

[57] ABSTRACT

A multiprocessor system and method for allocating data into a cachet to minimize the amount of data transaction among the caches for achieving a cache consistency. The system has a plurality of processors, each having a cache. An outside common memory stores data and a bus line is coupled among the respective caches for transferring data among the caches and the common memory for achieving a snooping function among the caches in order to maintain cache consistency. Each processor further includes a memory space allocation controller for controlling a requested data into the cache with a predetermined cache line unit. The memory space allocation controller includes a memory space allocation requestor, a cache line size recognizer and memory space allocator for allocating memory space in accordance with instructions from both the memory space allocation requestor and the cache line size recognizer so as to allocate the requested data within a minimum cache line number.

10 Claims, 4 Drawing Sheets

GROUPED VARIABLE SPACE
[GROUP] SIZE = 12 BYTES
```
STRUCT GROUP {
    INT a ;
    INT b ;
    INT c ;
} ;
```

GROUPED VARIABLE SPACE
[GROUP] SIZE = 16 BYTES
```
STRUCT GROUP {
    INT a ;
    INT b ;
    INT c ;
} ;
```
STRUCT GROUP GROUP-ARRAY [3];

Fig. 9(b)

MULTIPROCESSOR COMPUTER SYSTEM AND A METHOD FOR MEMORY ALLOCATION TO OPTIMIZE CACHE COHERENCY WITHIN THE SYSTEM

This is a continuation of application Ser. No. 08/427,821, filed on Apr. 26, 1995, abandoned.

FIELD OF THE INVENTION

This invention relates to a multiprocessor system in which each processor includes a cache and method for achieving cache consistency in such a system using a so-called snooping function.

BACKGROUND OF THE INVENTION

Recent improvements in processor efficiencies have rapidly increased the difference between the efficiencies of processors and of external memories.

In order to adjust the efficiency differences between processors and memories, caches are used in processors.

A multiprocessor system includes a plurality of processors and a common memory. Each processor has a cache and is coupled with each other processor through a bus in order to achieve cache consistency among them.

A snooping function among the caches in a multiprocessor system is important in order to maintain cache consistency within the system. There are several methods for achieving a cache snooping function, including the so-called copy back, write back, and write through methods and so on. However, whichever snooping method is used, it is impossible to couple a large number of processors to a bus without an excessive amount of bus traffic being caused by the snooping. As mentioned above, it is important for a multiprocessor system to maintain cache consistency. In a multiprocessing system, the frequency of data transfers among the caches in order to maintain cache consistency rapidly increases with the number of processors coupled to the system bus.

As a result, in order to limit traffic intensity on the bus line, only a small number of processors are typically coupled to a bus in a multiprocessing system.

Thus, conventionally it was not possible to achieve a real multiprocessor system in which a large number of processors (for example, more than 6 processors) are coupled to a common bus line while achieving cache consistency among the processors.

In order to achieve a snooping function among a large number of processors, it is very important to reduce the amount of the bus traffic needed for data transfers of renewed data among the caches. Usually, such data transfers between and among the caches in a multiprocessor is executed in byte or word units. Such byte or word unit transfers cause increases in the data transfer overhead and increases in the amount of bus traffic intensity.

To improve this defect, data is transferred among caches by using a cache line as a transfer unit instead of a byte or a word. A cache line is comprised of a predetermined number of bytes, e.g., 16, 32, or 64 bytes. Conventional memory space allocation in a cache is practiced with no consideration of the cache line size. Consequently, an unnecessarily large amount of the memory space is frequently allocated for a small size data. Further, small size data are often allocated in memory to occupy a number of cache lines. Consequently, an unnecessarily large number of cache lines, which exceeded a necessary amount of data size, are frequently occupied for a small data transfer.

As a result, the amount of the bus traffic intensity is also unduly increased during snooping among caches in a multiprocessor system.

SUMMARY OF THE INVENTION

Accordingly, it is an object of the invention to provide a multiprocessor system in which each processor includes a cache with a cache-coherency control and a method for practicing memory space allocation during an execution of a process with a consideration of a cache line size of the cache.

It is another object of this invention to provide a new multiprocessor system having a memory allocation controller and method for practicing memory space allocation in a cache by the allocation controller with consideration of a cache line size of the cache.

It is further object of this invention to provide a multiprocessor with a cache coherency control and method for practicing memory space allocation in a cache so as to reduce the overhead amount of the bus transaction for achieving a snooping function among the caches in the multiprocessor.

It is still another object of this invention to provide a multiprocessor system with a cache coherency control and method for allocating memory space in a cache so as to minimize the bus transaction for achieving a cache consistency among the caches in consideration of a cache line size.

It is still a further object of this invention to provide a multiprocessing computer system with a cache coherency control and method for allocating memory space in a cache so as to minimize the traffic intensity for achieving a snooping function among the caches in the multiprocessor with a consideration of a necessary amount of cache lines.

This invention relates to a multiprocessor system in which each processor includes a cache and a memory space allocation controller and method for practicing memory space allocation by the allocation controller during an execution of a process with a consideration of a cache line size.

More particularly, this invention relates to a multiprocessor including a large number of processors which are coupled to a common memory through a bus and a method for controlling a memory space allocation in a cache for minimizing the traffic intensity of the bus for achieving a snooping function among the caches.

Furthermore particularly, this invention relates to a multiprocessor system and method for allocating data in the minimum cache lines so as to achieve cache consistency among the caches with a minimum transfer of the allocated cache lines.

The multiprocessor system of the present invention includes a plurality of processors, each processor having a cache, an outside common memory for storing data and a bus line coupled among the respective caches for transferring data among the caches and the common memory for achieving a snooping function among the caches in order to maintain cache consistency.

Each of the processors further includes a memory space allocation controller for controlling a memory space allocation for a requested data into the cache with a predetermined cache line unit.

The controller for controlling memory space allocation includes a memory allocation requestor for requesting a memory space allocation, a cache line size recognizer for recognizing the size of the cache line and a memory space allocator for practicing a memory space allocation in accordance with the instructions from both of the memory space allocation requestor and the cache line size recognizer so as to allocate the requested data within a minimum cache line number.

Thus, in one aspect, this invention is a multiprocessor system comprising: a plurality of processors, each of the processors includes a cache; an outside common memory for storing data, a bus line coupled among the respective caches for transferring data among the caches and the common memory for achieving a snooping function among the caches in order to maintain cache consistency. Each of the processor further includes a memory space allocation controller for a requested data into the cache with a predetermined cache line unit, and the memory space allocation controller including a memory space allocation requestor, a cache line size recognizer and a memory space allocator for allocating memory space in accordance with the instructions from both of the requesting a memory space allocation requestor and the cache line size recognizer so as to allocate the requested data within a minimum cache line number.

In some preferred embodiments, the memory space allocator in the memory space allocation controller uses the following formula, evaluated by integer computations, in order to determine the a minimum cache line number:

$$(\text{Requested size of memory space allocation} + \text{cache line size} - 1) \div \text{cache line size}$$

In some embodiments of the multiprocessor system according to the present invention, the memory space allocator in the memory space allocation controller uses the following formula, evaluated by integer computations, for deciding whether a remaining space in the minimum cache line having been used for a previous data allocation should be used for the following data allocation with comparing a predetermined cache line occupation ratio N (N=0–100):

$$(((\text{Requested size of memory space allocation} + \text{cache line size} - 1) \div \text{cache line size}) \times \text{cache line size})$$

In other embodiments of the multiprocessor system according to the present invention, the memory space allocation controller further includes a cache alignment recognizer for recognizing the alignment of the cache line and for providing a predetermined cache line alignment to the memory space allocator.

In some embodiments of the multiprocessor system according to the present invention, the memory space allocation requestor in the memory space allocation controller requests a minimum allocation size of a requested data, and the memory space allocator in the memory space allocation controller uses the following formula, evaluated by integer computations, in order to determine the minimum cache line number:

$$((\text{Requesting minimum allocation size of a memory space} + \text{cache line size} - 1) \div \text{cache line size}) \times \text{cache line size}$$

In some embodiments of the multiprocessor system according to the present invention, the memory space allocation controller further includes a memory allocation reporter in order to report a head or start address of the memory allocation being allocated by the memory space allocator to a memory allocation requesting side.

In some embodiments of the present invention, the memory space allocation requestor includes an instruction switch for switching a memory allocation method between a method with consideration of a cache line and a method without consideration of a cache line.

In another aspect, this invention is a method for practicing a memory allocation into a minimum number of cache line in a cache of a processor for a multiprocessor system. The method includes the steps of: receiving a request for allocating a data in a memory space of the cache line of the cache; recognizing the size of the cache line; deciding a necessary minimum number of the cache line for allocating a requested data, and practicing a memory allocation the requested data into the minimum number of the cache line.

In some preferred embodiments of the method of this invention, the step of deciding a necessary minimum number of the cache line for allocating a requested data uses the following formula, evaluated by integer computations, in order to determine the minimum cache line number:

$$(\text{Request size of memory space allocation} + \text{cache line size} - 1) \div \text{cache line size}$$

In other preferred embodiments of this invention, the step of practicing a memory allocation the requested data into the minimum number of the cache line further includes a step for deciding whether a remaining space in the minimum cache line having used for a previous data allocation should be used to the following data allocation with comparing a predetermined cache line occupation ratio N (N=0–100) by using the following formula, evaluated by integer computations:

$$(((\text{Requested size of memory space allocation} + \text{cache line size} - 1) \div \text{cache line size}) \times \text{cache line size})$$

In another aspect, this invention is a method for practicing a memory allocation into a minimum number of cache line in a cache of a processor for a multiprocessor system. The method includes the steps of: receiving a request for allocating a data in a memory space of the cache line of the cache; recognizing the size of the cache line; recognizing the alignment of the cache line; deciding a necessary minimum number of the cache line for allocating a requested data; practicing a memory allocation the requested data into the minimum number of the cache line, and reporting a head address of the memory allocation in the step of practicing a memory allocation.

In another aspect, this invention is a method for practicing a memory allocation into a minimum number of cache line in a cache of a processor for a compiler/linker. The method includes receiving a request for allocating a data in a memory space of the cache line of the cache; recognizing the size of the cache line; deciding a necessary minimum number of the cache line for allocating a requested data; practicing a memory allocation the requested data into the minimum number of the cache line; and the step of deciding a necessary minimum number of the cache line for allocating a requested data uses the following formula, evaluated by integer computations:

$$(\text{Grouped variable space size} + \text{cache line size} - 1) \div \text{cache line size}$$

In some embodiments of the method for practicing a memory allocation, the step of practicing memory allocation the requested data into the minimum number of the cache line further includes deciding whether a remaining space in the minimum cache line having used for a previous data allocation should be used to the following data allocation with comparing a predetermined cache line occupation ratio N (N=0–100) by using the following formula, evaluated by integer computations:

(((Grouped variable space size + cache line size − 1) + cache line size × cache line size) − grouped variable space size)

In another aspect, this invention is a method for practicing a memory allocation into a minimum number of cache line in a cache of a processor for a compiler/linker. The method includes receiving a request for allocating a grouped structure data in a memory space of the cache line of the cache; recognizing the size of the cache line; deciding a necessary minimum number of the cache line for allocating a requested data; practicing a memory allocation the requested data into the minimum number of the cache line; and the step of deciding a necessary minimum number of the cache line for allocating a requested data uses the following formula, evaluated by integer computations:

((Grouped variable space size+cache line size−1)+cache line size )×cache line size.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

Now referring to figures, preferable embodiments of the present invention will be explained.

Figure 1:
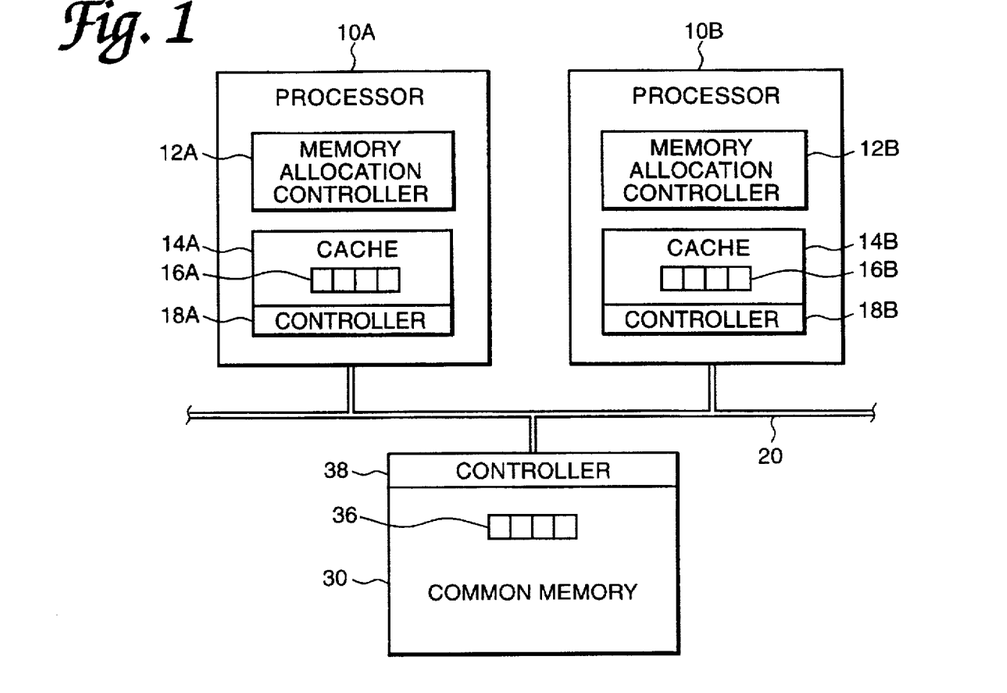
FIG. 1 shows a schematic diagram of a preferable embodiment of the multiprocessor system according to the present invention.

FIG. 1 shows a schematic diagram of a preferred embodiment of the multiprocessor system according to the present invention.

The multiprocessor includes a plurality of processors 10A, . . . 10B, a common memory 30 and a bus line 20 for coupling the plurality of processors 10A, . . . 10B, and the common memory 30.

Each processor 10A, . . . 10B includes a memory space allocation controller 12A, . . . 12B and cache 14A, . . . 14B. Each cache 14A, . . . 14B stores subject data in a cache with an unit of line 16A, . . . 16B.

The respective processors 10A, . . . 10B and the common memory 30 are coupled to a common bus 20 for transferring data among them.

The respective caches 14A, . . . 14B and the common memory 30 have controllers 18A, . . . 18B and 38, respectively for controlling the operations of data reading/writing to the respective memories.

In FIG. 1, the four-block line 16A, . . . 16B in the caches 14A, . . . 14B, respectively, and the same four-block line 36 of the memory 30 indicate the respective cache line for using a memory space allocation.

For achieving a snooping function, the data in the respective caches 14A, . . . 14B is transferred through the bus line 20 with unit the cache line 16A, . . . 16B as unit.

Figure 2:
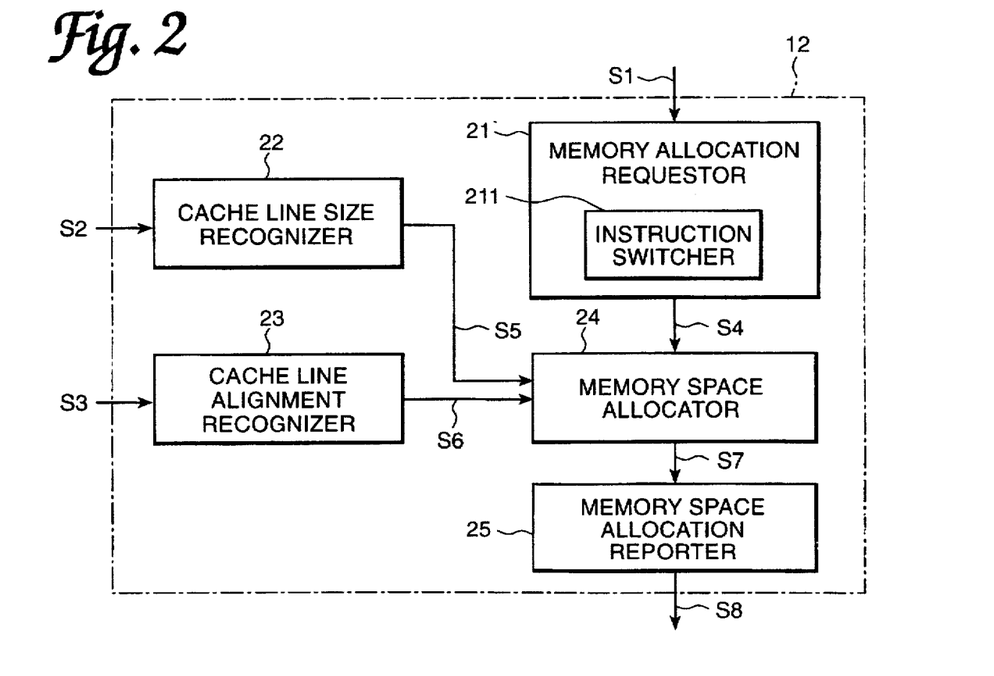
FIG. 2 depicts a preferable construction of the memory allocation controller used for the multiprocessor of FIG. 1.

FIG. 2 illustrates the detailed construction of the memory space allocation controller 12 in FIG. 1. The memory allocation controller 12 includes a memory space allocation requestor 21, a cache line size recognizer 22, a cache line alignment recognizer 23, a memory space allocator 24 and an allocated memory space reporter 25.

The memory allocation requestor 21 receives a request signal S1 for requesting a memory space allocation from the system processor, for example an instruction signal from an OS program of the system or from a system compiler/linker (not shown in the figures).

After receiving the request signal S1, the memory allocation requestor 21 delivers an allocation requesting signal S4 to the memory allocator 24 for instructing an execution of a memory allocation in the cache 14 in FIG. 1.

The cache line size recognizer 22 examines the size of a cache line 16 which is inherently fixed depending upon the system by examining a cache line size S2 from a system register (not shown in FIG. 2).

The memory allocator 24 receives a cache line size indicating signal S5 from the cache line size recognizer 22.

The cache line alignment recognizer 23 examines a cache line alignment signal S3 from a cache control register (not shown in FIG. 2) and delivers a cache alignment instruction signal S6 to the memory allocator 24.

With reference to the allocation requesting signal S4 and the cache line size indicating signal S5, the memory allocator 24 determines the necessary minimum number of cache lines for a requested memory allocation and it practices the actual memory allocation under the decision.

Minimizing the number of cache lines is important for minimizing an amount of the data transaction in a bus line for achieving a snooping function.

Namely, the memory allocator 24 practices memory allocation so as to fit the subject data within a decided minimum number of cache lines by using an formula explained as below.

Further, the memory allocation requestor 21 can include an instruction switcher 211 for selectively changing the memory allocation between the cache line size control method of the present invention and a non-control method.

When the instruction switcher 211 selects a non-control method, the memory allocator 24 practices a memory allocation without any consideration of the cache line size from the cache line size recognizer 22 and the cache line alignment from the cache line alignment recognizer 23.

Hereinafter, the explanation is made by supposing that the instruction switcher 211 selects a cache line size examining method.

After practicing a memory allocation, the memory allocator 24 determines whether or not the remaining vacant space in the allocated cache line by a previous memory allocation should be used for the following memory allocation.

The usage determination of the remaining vacant space in the cache line is depending upon a predetermined ratio N of the remaining vacant size against the total size of the cache line size. Namely, the ratio N percent is a predetermined value which is selected between 0 and 100 (N=0–100).

After practicing a memory allocation, the memory allocator 24 send an allocation reporting signal S7 to the memory space allocation reporter 25 which delivers a heading instruction signal S8 to the memory allocation request side by reporting a head address of the previous memory allocation in a cache.

Figure 3:
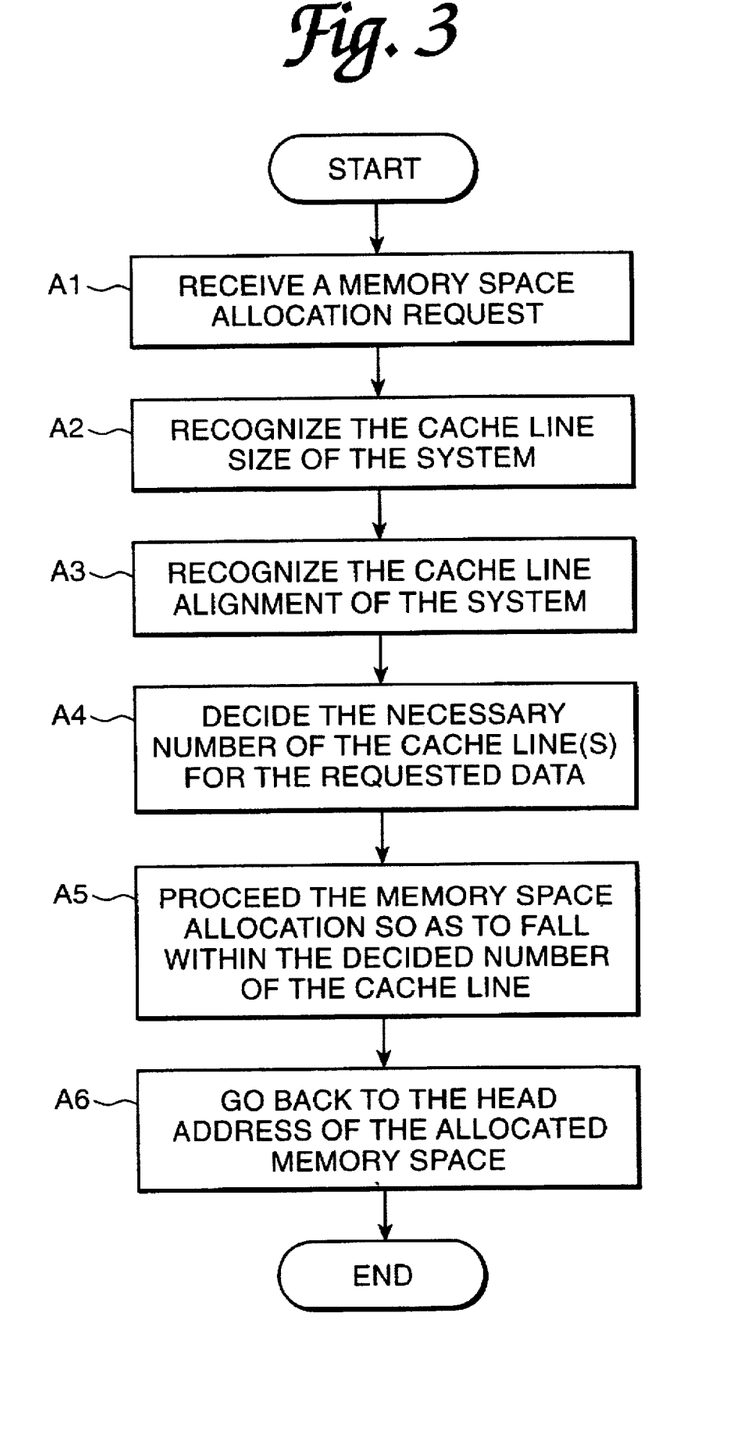
FIG. 3 is a flow chart for depicting one method for an operation of a memory allocation in a cache by the memory allocation controller 12.

FIG. 3 is a flow chart for explaining one method for operation of a memory allocation in a cache by the memory allocation controller 12.

At the first step A1, the memory allocator 24 in FIG. 1 receives a memory allocation request signal from the memory allocation requestor 21 in FIG. 1.

As explained before, the instruction switcher 211 instructs to execute the memory allocation by the method of the present invention of the examining a cache line size.

At the second and the third steps, A2 and A3, the memory allocator 24 recognizes the size and the alignment of the subject cache line respectively.

With reference to the requested data size and the recognized cache line size, at the fourth step A4, the memory allocator 24 decides the necessary minimum number of cache lines for the requested memory allocation.

The determination of the necessary minimum number of cache lines for the requested memory allocation is based upon the calculation under the following formula (1), evaluated using integer computations:

$$(\text{Requested size of memory space allocation} + \text{cache line size} - 1) \div \text{cache line size} \quad (1)$$

The calculation of this necessary minimum number of the cache lines is made by an integer computation, omitting the fractions of the formula (1).

FIGS. 4 to 9(b) explain various examples of the memory allocation in cache lines.

Figure 4:
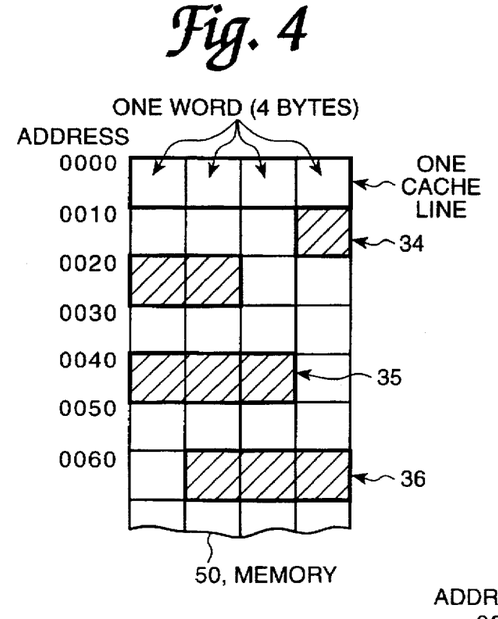
FIG. 4 is a first embodiment of the memory allocation according to the method of this invention.

FIG. 4 is a first embodiment of the memory allocation by using the method according to the present invention. For a better understanding, all embodiments of the memory allocation are explained assuming that one word is 4 bytes and one cache line is 16 bytes. Of course, one word and one cache line can have a different number of bytes depending upon the system.

Suppose the memory space allocator 24 receives a request for a memory allocation of 12 bytes from the memory space allocation requestor 21 and the cache line size recognizer 22 recognizes that one cache line is constructed by 16 bytes.

In FIG. 4, the first allocation 34 shows an example of the conventional allocation which does not consider the cache line size. The requested allocation data of 12 bytes is started from the address point 001C, the fourth block of the cache line of the address 0000, and the allocation extends to the second block of the next cache line of the address 0020.

Although the requested allocation data of 12 bytes is smaller than the size of a cache line, it occupies two cache lines when the size of the cache line is not considered.

This causes an increase in the bus traffic transaction because two cache lines have to be transferred to achieving a cache consistency among the caches.

On the contrary, according to the method of the present invention, the memory allocator 24 practices the memory allocation with reference to the requested data size and the cache line size so as to fit the allocation of the requested data within a minimum cache lines which is obtained by the above-mentioned formula (1).

In the example in FIG. 4, the necessary minimum number of cache line is (12+16=1)+16=1 (by omission of fractions).

Accordingly, the requested 12 bytes of data is allocated within one cache line, as shown in the example allocations 35 or 36 in FIG. 4. The data allocation 35 starts from the memory address 0040 and the allocation 36 starts from the address of 006A, the second block of the cache line of the address 0060, and both of data are stored within the respective same cache line.

After practicing the memory allocation, the memory allocator 24 determines whether the remaining vacant space of the cache line which is used for the previous memory allocation should be used to the following memory allocation by an integer calculation of the following formula (2).

$$(((\text{Requested size of memory space allocation} + \quad (2)$$

$$\text{cache line size} - 1) \div \text{cache line size}) \times \text{cache line size})$$

As a result of the calculation of the formula (2), if the occupied allocation space in the cache line exceeds the predetermined ratio N % (N=0–100) against the total cache line size, the memory allocator decides not to use the remaining vacant space in the cache line for allocating the next requested allocation data.

Figure 5:
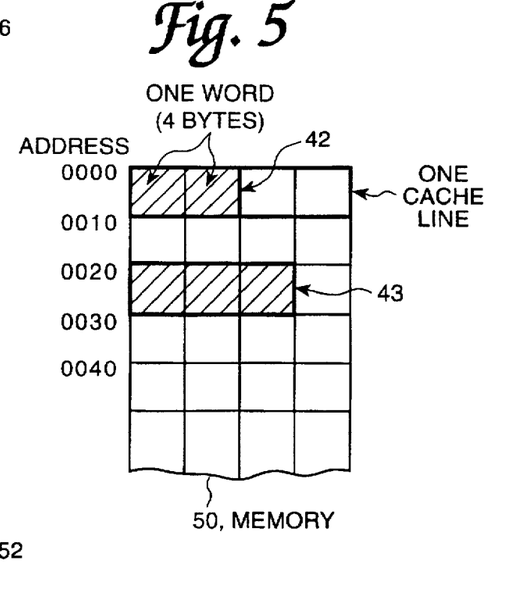
FIG. 5 depicts a second embodiment of the method of memory allocation for a multiprocessor according to the present invention.

If the ratio N is predetermined, for example, as 70% and the requested allocation data 42 of 8 bytes occupies only 50% of the cache line of the address 0000 as shown in FIG. 5, the remaining 8 bytes vacant space of the same cache line is decided to use for the next requested data allocation.

On the contrary, the allocation 43 starting from the address 0020 as shown in FIG. 5 has already occupied the 75% of the cache line for allocating a requested data of 12 bytes. Consequently, it exceeds the predetermined ratio 70% and the remaining space is not usable for the following memory allocation.

As explained above, the memory allocator practices the requested memory allocation so as to fit the request data within a minimum number of the cache lines.

Accordingly, when a data is renewed in a cache in a processor, the corresponding data in the other caches in the microprocessor at the same address can snoop the change of the data with a minimum bus traffic transaction through a bus line.

Since the memory space allocator can flexibly change the value of the ratio N of the cache line, it is possible to determine the effective usage size of the cache line for a memory allocation.

Following are other embodiments of the memory allocation according to the method for a memory allocation according to the present invention.

Figure 6:
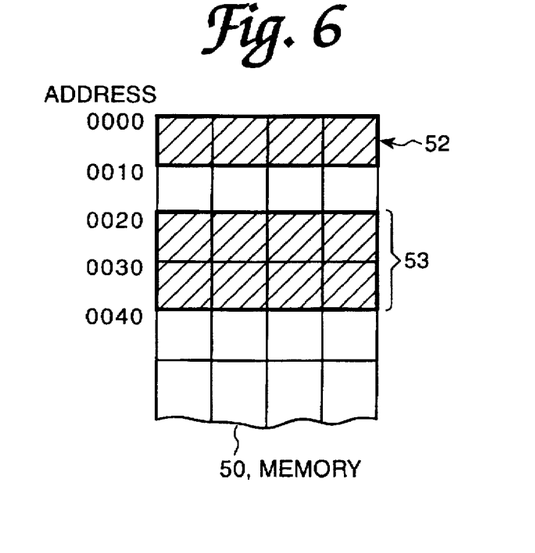
FIG. 6 illustrates one embodiment of the memory allocation of this invention in which the minimum allocation size is instructed.

FIG. 6 illustrates one embodiment of the memory allocation in which the minimum allocation size is instructed.

The memory allocator practices the memory allocation so as to minimize the bus transaction with based upon the requested minimum allocation size for a subject data and the cache line size from the cache line size recognizer.

In this embodiment, the memory allocator practices the memory allocation so as to fit the requested minimum allocation size of data within the number of cache line which is determined by the calculation of the following formula (3), evaluated by integer computations:

$$((\text{Requesting minimum allocation size of a memory space} + \text{cache line size} - 1) \div \text{cache line size}) \times \text{cache line size} \quad (3)$$

If the memory allocator receives an instruction of a minimum allocation size of 4 bytes, the memory allocation is done as shown by the allocation 52 starting from the address 0000 in FIG. 6 in accordance with the calculation of the formula (3).

If the memory allocation requestor instructs a minimum allocation size of 16 bytes to the memory allocator, the memory allocation is practiced as shown by the allocation 53 which starts from the cache line of the address of 0020 and continues to the next cache line of the address of the 0030 in FIG. 6 in accordance with the formula (3).

In this case, since the memory allocation is practiced with a cache line unit, and with minimizing the necessary number of the cache lines, this method also can reduce the occurrence of the unnecessary amount of the data transaction for achieving a snooping function in the multiprocessor.

Figures 7A, 7B, 8, 9A, 9B:
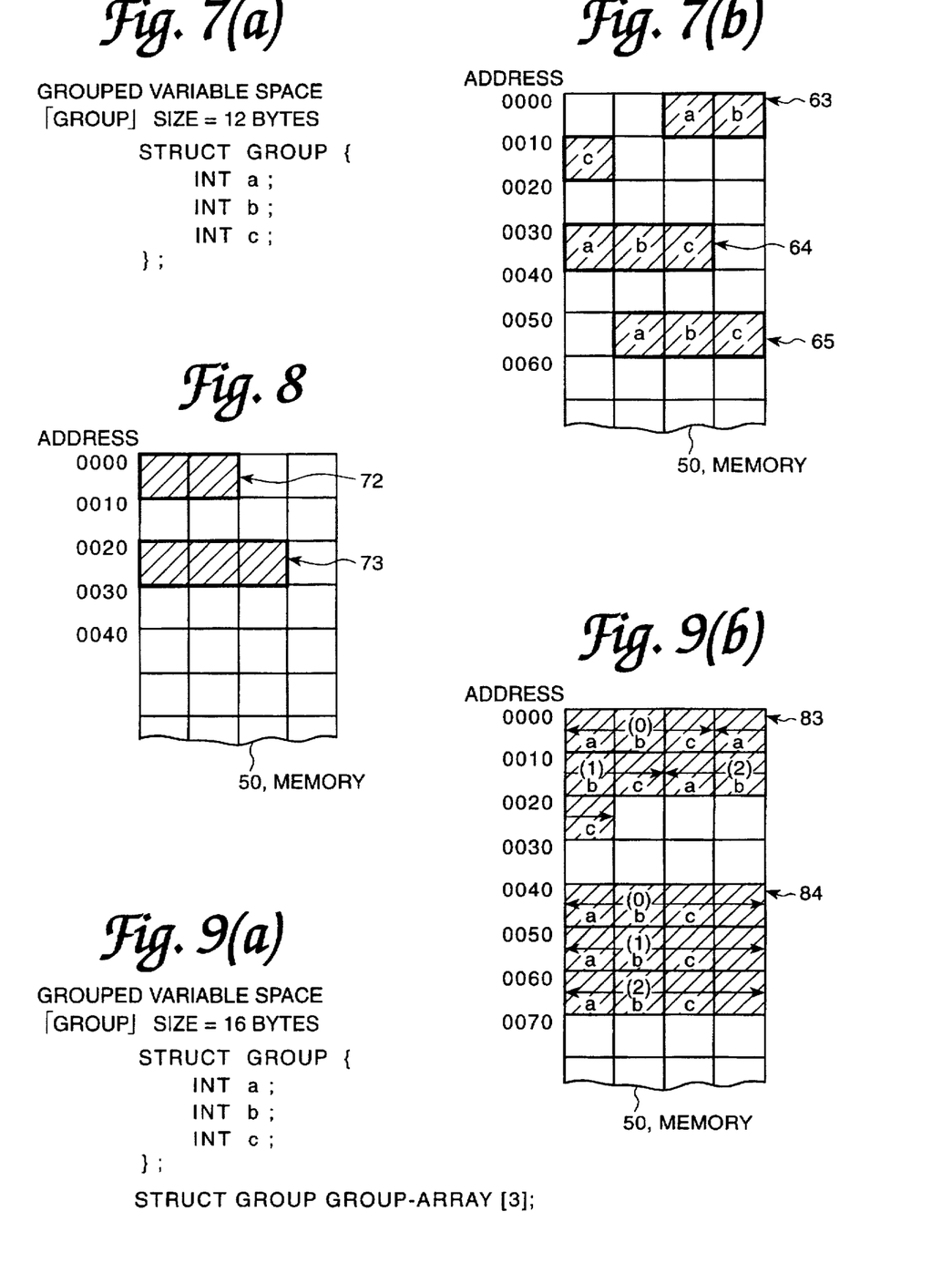
FIG. 7(a) shows an example of a declaration of a grouped variable space in the C programming language.
FIG. 7(b) explains the application to the compiler/linker of the method of this invention for a memory allocation.
FIG. 8 shows a fifth embodiment of the method memory allocation for a multiprocessor.
FIG. 9(a) shows an example of a declaration of a grouped structure of a grouped array in the C programming language.
FIG. 9(b) shows another embodiment of the memory allocation for the grouped structure of group-array of bytes for a compiler/linker.

FIGS. 7(a) and 7(b) explain the application of the method of the present invention to a compiler/linker for a memory allocation. FIG. 7(a) indicates an example of a declaration of a grouped variable space in the C programming language.

In this example, the size of the grouped variable space, |group2|, is assumed to be twelve (12) bytes. Namely, size of (struct group) is 12.

The grouped structure includes three int-type variables, int a, int b and int c.

The allocation 63 in FIG. 7(a) illustrates an example of an unenforced allocation of |group| which starts from the third block of the cache line of the address 0000 and overlaps to the next cache line of the address 0010.

In order to store the requested grouped structure within a minimum number of cache lines, the necessary number of the cache lines is determined by the calculation of the following formula (4), using integer calculations:

$$(\text{Grouped variable space size} + \text{cache line size} - 1) \div \text{cache line size} \quad (4)$$

In this application to the compiler/linker, the necessary minimum number of cache lines is determined as 1 by the calculation of the formula (4).

After practicing the enforced group memory allocation, the memory allocator whether the remaining vacant space of the minimum cache line should be used for the next group memory allocation under the following formula (5), evaluated using integer computations:

$$(((\text{Grouped variable space size} + \text{cache line size} - 1) \div \text{cache line size} \times \text{cache line size}) - \text{grouped variable space size}) \quad (5)$$

If the remaining vacant space size in the cache line reaches the predetermined ratio N against the cache line size, the remaining space is not used for the following memory allocation.

In the example of FIG. 8, the usage decision of the remaining space in the allocated cache line for the following group memory allocation is considered to the example of FIG. 5.

Namely, if the ratio N is determined as 70%, since the remaining space in the allocated cache line of the address of 0000 is 50% and it does not reach the predetermined value of the ratio, it is used for the following grouped memory allocation.

The grouped 12 bytes variable which is allocated the cache line of the address of 0020 in FIG. 8 occupies 75% of the cache line. In this case, the remaining space is not used for the following the group allocation.

FIGS. 9(a) and 9(b) explain another embodiment of the memory allocation for the grouped structure of group array of 16 bytes for a compiler/linker. Namely, as shown in FIG. 9(a), the size of structure group of the group-array [3] is 12 bytes.

If the allocation is practiced according to a normal method, the group array structures are successively allocated as shown by the group allocation 83 in FIG. 9(b).

Namely, both of the grouped structures (1) and (2) extend over the two cache lines. This causes an increase in the bus transaction for achieving a snooping function among the grouped structure values.

If a respective grouped structure is enforceably allocated as shown by the group allocation 84 in FIG. 9(b) by enforceably rounding up the cache line, the transaction can be minimized for achieving a snooping function.

The necessary minimum number of the cache lines for the grouped structure of the group array is obtained by the following formula (6), evaluated by integer computations:

$$((\text{Grouped variable space size} + \text{cache line size} - 1) \div \text{cache line size}) \times \text{cache line size} \quad (6)$$

Namely, the size of the respective grouped structure (0), (1) and (2) is enforceably rounded up to 16 bytes by adding dummy data space in order to minimize the bus transaction for achieving the snooping function of the cache consistency.

As explained above, according to the multiprocessor of the present invention, the memory allocation is practiced with a consideration of a cache line size. Consequently, it can reduce the amount of the bus transaction for achieving cache consistency in the multiprocessor.

In the embodiment of the figures, only single stage cache is used for ease of understanding. However, it is possible to use a multi stage cache for the multiprocessor.

One skilled in the art will appreciate that the present invention can be practiced by other than the described embodiments, which are presented for purposes of illustration and not limitation, and the present invention is limited only by the claims that follow.

What is claimed is:

1. A multiprocessor system comprising:
   (a) a plurality of processors, each having a cache for storing data;
   (b) an external common memory for storing data;
   (c) a bus coupled to the common memory and to each cache for transferring data among the caches and the common memory, and
   (d) a memory allocation controller for controlling allocation of memory space, wherein
   the memory allocation controller comprises:
   (i) means for accepting a memory space allocation request from said processors, (ii) means for recognizing a size of a line of said cache, (iii) means for allocating memory space based on a requested size of memory space allocation obtained from the memory space allocation request obtained from the means for accepting and on the size of the line of said cache obtained from the recognizing means so as to allocate the requested memory space within a minimum possible number of cache lines in said cache during caching data from the memory to the cache, and (iv) means for recognizing the alignment of the cache and for providing the alignment to the memory space allocation means, wherein said means for allocating memory space uses a predetermined cache line occupation ratio in order to determine whether a cache line should be used for an allocation, and wherein the means for requesting memory space allocation requests a minimum allocation size for a requested data, and the memory space allocation means uses the following formula, evaluated by integer computations, to determine the minimum number of cache lines:

((requested minimum allocation size of a memory space+cache line size−1)+cache line size)×cache line size.

2. A multiprocessor system comprising:

(a) a plurality of processors, each having a cache for storing data;

(b) an external common memory for storing data;

(c) a bus coupled to the common memory and to each cache for transferring data among the caches and the common memory, and (d) a memory allocation controller for controlling allocation of memory space, wherein the memory allocation controller comprises:

(i) means for accepting a memory space allocation request from said processors, (ii) means for recognizing a size of a line of said cache, (iii) means for allocating memory space based on a requested size of memory space allocation obtained from the memory space allocation request obtained from the means for accepting and on the size of the line of said cache obtained from the recognizing means so as to allocate the requested memory space within a minimum possible number of cache lines in said cache during caching data from the memory to the cache, and (iv) means for reporting a start address of said memory allocation being allocated to a memory allocation requesting side, and (v) instruction means for switching a memory allocation method between a method which considers the line size of said cache and a method which does not consider the line size of said cache, wherein the means for requesting memory space allocation requests a minimum allocation size for a requested data, and the memory space allocation means uses the following formula, evaluated by integer computations, to determine the minimum number of cache lines:

((requested minimum allocation size of a memory space+cache line size−1)+cache line size)×cache line size.

3. A method for allocating memory space using a minimum number of cache lines in a cache of a processor in a multiprocessor system including a memory, the method comprising the steps of:

receiving a request for memory space to allocate data in the memory;

recognizing a size of a line of the cache;

determining a necessary minimum number of cache lines to allocate the memory space to the data based on the size of the cache line, wherein the determining determines the minimum number of cache lines based on the following formula, evaluated by integer computations:

(requested size of memory space allocation+cache line size−1)+cache line size;

allocating memory space to the data such that the minimum number of cache lines will be used when caching the data from the memory to the cache, the allocating step further comprising the step of deciding, based on a predetermined cache line occupation ratio, whether remaining space in a cache line which has been used for a previous allocation should be used for a subsequent allocation.

4. A method for allocating memory such that caching of the memory will use a minimum number of cache lines in a cache of a processor of a multiprocessor system, the method comprising the steps of:

receiving a request to allocate data in the memory;

recognizing a size of a line of the cache;

recognizing the alignment of said cache line;

determining a minimum number of cache lines for allocating the data based on the size and alignment based on the following formula, evaluated by integer computations:

(requested size of memory space allocation+cache line size−1)+cache line size;

allocating the data in the memory such that caching of the data will use the minimum number of cache lines, the allocating step further comprising the step of deciding, based on a predetermined cache line occupation ratio, whether remaining space in a cache line which has been used for a previous allocation should be used for a subsequent allocation; and reporting a start address of the memory allocation.

5. A method for a compiler/linker to allocate memory for a grouped variable in a cache using a minimum number of cache lines, the method comprising the steps of:

receiving a request to allocate the grouped variable in the cache;

recognizing a size of a line of the cache;

deciding a minimum number of cache lines needed to allocate the variable based on the formula, evaluated by integer computations:

(grouped variable space size+cache line size−1) +cache line size;

and allocating the variable into the minimum number of cache lines, said allocating step further comprising the step of deciding, based on a predetermined cache line occupation ratio, whether remaining space in a cache line which has been used for a previous allocation should be used for a subsequent allocation.

6. A method for a compiler/linker to allocate memory for a grouped structure of data using a minimum number of cache lines in a cache of a processor, the method comprising the steps of:

(a) receiving a request to allocate a grouped structure of data in the cache;

(b) recognizing a size of a line of said cache;

(c) deciding a necessary minimum number of cache lines needed to allocated the requested data based on the following formula, evaluated by integer calculations:

$$((\text{grouped variable space size} + \text{cache line size} - 1) \div \text{cache line size}) \times \text{cache line size};$$

and (d) allocating memory for the requested data using the minimum number of cache lines, said allocating step further comprising the step of deciding, based on a predetermined cache line occupation ratio, whether remaining space in a cache line which has been used for a previous allocation should be used for a subsequent allocation.

7. A multiprocessor system comprising:

(a) a plurality of processors, each having a cache for storing data;

(b) an external common memory for storing data;

(c) a bus coupled to the common memory and to each cache for transferring data among the caches and the common memory, and (d) a memory allocation controller for controlling allocation of memory space, wherein the memory allocation controller comprises:

(i) means for accepting a memory space allocation request from said processors, (ii) means for recognizing a size of a line of said cache, (iii) means for allocating memory space based on a requested size of memory space allocation obtained from the memory space allocation request obtained from the means for accepting and on the size of the line of said cache obtained from the recognizing means so as to allocate the requested memory space within a minimum possible number of cache lines in said cache during caching data from the memory to the cache, and (iv) means for recognizing the alignment of the cache and for providing the alignment to the memory space allocation means, wherein said means for allocating memory space uses a predetermined cache line occupation ratio in order to determine whether a cache line should be used for an allocation, and wherein the means for requesting memory space allocation requests a minimum allocation size for a requested data, and the memory space allocation means determines the minimum number of cache lines based on (a) the requested minimum allocation size of a memory space and (b) the cache line size.

8. A system as in claim 7 wherein the memory space allocation means uses the following formula, evaluated by integer computations, to determine the minimum number of cache line lines:

$$((\text{requested minimum allocation size of a memory space} + \text{cache line size} - 1) \div \text{cache line size}) \times \text{cache line size}.$$

9. A multiprocessor system comprising:

(a) a plurality of processors, each having a cache for storing data;

(b) an external for storing data;

(c) a bus coupled to the common memory and to each cache for transferring data among the caches and the common memory, and (d) a memory allocation controller for controlling allocation of memory space, wherein the memory allocation controller comprises:

(i) means for a accepting a memory space allocation request from said processors, (ii) means for recognizing a size of a line of said cache, (iii) means for allocating memory space based on a requested size of memory space allocation obtained from the memory space allocation request obtained from the means for accepting and on the size of the line of said cache obtained from the recognizing means so as to allocate the requested memory space within a minimum possible number of cache lines in said cache during caching data from the memory to the cache, (iv) means for reporting a start address of said memory allocation being allocated to a memory allocation requesting side, and (v) instruction for switching a memory allocation method between a method which considers the line size of said cache and a method which does not consider the line size of said cache, wherein the means for requesting memory space allocation requests a minimum allocating size for a requested data, and the memory space allocation means determines the minimum number of cache lines based on (A) the requested minimum allocation size of a memory space and (B) the cache line size.

10. A system as in claim 8 wherein the memory space allocation means uses the following formula, evaluated by integer computations, to determine the minimum number of cache lines:

$$((\text{requested minimum allocation size of a memory space} + \text{cache line size} - 1) \div \text{cache line size}) \times \text{cache line size}.$$

* * * * *